UNITED STATES PATENT OFFICE.

HENRY A. GARVEY, OF MEMPHIS, TENNESSEE.

IMPROVED ARTIFICIAL MARBLE OR PLASTIC MATERIAL.

Specification forming part of Letters Patent No. 94,736, dated September 14, 1869.

*To all whom it may concern:*

Be it known that I, HENRY A. GARVEY, of Memphis, county of Shelby and State of Tennessee, have invented a new and useful Improvement in Artificial Marble, or Lithomarlite; and I do hereby declare that the following is a full and exact description thereof.

The nature of my invention consists in providing a composition of plaster-of-paris and other materials, which may be molded in any desired form, which composition, when allowed to set or harden, will form a substance resembling different kinds of marble, susceptible of the highest polish.

To enable others skilled in the art to make and use my invention, I will proceed to describe the method of its production and use.

To four gallons of water, I use one-half pint of liquid glue size, or three or four ounces of pulverized borax; I then mix them thoroughly. I then add plaster-of-paris until the composition becomes of the proper consistency for molding. I then let the mixture stand ten minutes; then mix the composition thoroughly.

The marbleizing is then done by lightly dusting the surface of the mixture with the color chosen, and mixing with a trowel till the veins suit. The composition is then poured slowly on plates of glass, or other smooth surfaces embedded in plaster, secured to two-inch plank.

The bench on which the plank rests is then smartly tapped with a mallet until the air leaves the mixture, which will be known by bubbles ceasing to rise. Plaster-of-paris is then sprinkled on the top of the mixture until all the moisture is removed.

The back mold is then put on, having india-rubber strips on the sides to confine the mixture. In this mold I have vent-holes, to allow the escape of water and surplus material.

The composition is then subjected to slow pressure, after which it is let rest thirty minutes, to allow the water to escape. The vent-holes are now plugged, and the pressure is increased. The molds are allowed to remain under maximum pressure for thirty minutes, when they are taken from the press, and as soon as heating commences, the back mold is removed, and the composition sprinkled with a solution of an ounce of borax to a gallon of water. Remove the castings as soon as the sprinkling runs to the face, and place on the edge in a drying-room.

When dry, the polish is made to stand out by rubbing briskly with corduroy.

A cheaper quality of lithomarlite can be made, omitting both pressure and rubbing.

For any of the purposes hereinafter named, are molds made of seasoned wood, faced with carriage-body finish, or material that will stand the pressure, and can be polished as high as wood. Before filling the molds rub them lightly with lard-oil. After the final pressure is given, watch closely, and as soon as heating begins remove the back mold and soak with the solution of borax and water. Strengthen castings by placing round galvanized iron rods between the molds.

I secure my lithomarlite to brick or mortar with plaster-of-paris, and to wood with four-penny or other nails, driven in the slabs close to their edges.

I use lithomarlite, or artificial marble, for all purposes for which plaster-of-paris is used, pedestals, fluted columns, clock-cases, wainscoting, base-board, mantels, vases, paper-weights, &c.

What I claim as my invention, and desire to secure by Letters Patent, is—

The within-described method of making artificial marble, hardening and causing it to be delivered from the molds with polished surface, for the objects described, and for the purposes specified.

HENRY A. GARVEY.

Witnesses:
J. J. WORRELL,
F. M. CAGSWELL.